US012612791B1

(12) United States Patent
Staley et al.

(10) Patent No.: US 12,612,791 B1
(45) Date of Patent: Apr. 28, 2026

(54) CAPTURE AND PIVOT INSTALLATION FITTINGS

(71) Applicant: Blue Origin Manufacturing, LLC, Huntsville, AL (US)

(72) Inventors: Nathan D. Staley, Enumclaw, WA (US); Park O. Cover, Jr., Orting, WA (US); Taylor R. Ladzinski, Seattle, WA (US); Michael A. Linquist, Seattle, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 1121 days.

(21) Appl. No.: 17/650,041

(22) Filed: Feb. 4, 2022

(51) Int. Cl.
| | |
|---|---|
| *E04G 3/24* | (2006.01) |
| *B29C 33/00* | (2006.01) |
| *B29C 70/54* | (2006.01) |
| *B29L 31/30* | (2006.01) |

(52) U.S. Cl.
CPC .............. *E04G 3/246* (2013.01); *B29C 33/00* (2013.01); *B29C 70/54* (2013.01); *B29L 2031/3097* (2013.01)

(58) Field of Classification Search
CPC .......... B29C 333/00; B29L 2031/3097; E04G 13/06
See application file for complete search history.

(56) References Cited

U.S. PATENT DOCUMENTS

| | | | |
|---|---|---|---|
| 2019/0016483 A1* | 1/2019 | Ewing | B29C 70/42 |
| 2024/0091989 A1* | 3/2024 | Møller | E04G 5/141 |

* cited by examiner

Primary Examiner — Alison L Hindenlang
Assistant Examiner — Debjani Roy
(74) Attorney, Agent, or Firm — Summit Patents PC

(57) ABSTRACT

Systems and methods for manufacturing a payload fairing are disclosed herein. The systems and method nest scaffolding within a shell of a payload fairing to allow for humans to inspect and otherwise manually work on the interior surface of the fairing during the manufacturing process. The disclosed fairing manufacturing systems and method have a capture and pivot installation fitting that includes a capture bucket on a mold and pivot pin on a nose scaffolding. The pivot pin fits or locks within the capture bucket, thereby forming a capture bucket-pivot pin engagement. The capture bucket-pivot pin engagement controls position and restricts movement to rotation around a single axis while restricting translational movement along all axes. The capture bucket-pivot pin engagement constrains translation along all axes. The capture bucket-pivot pin engagement also constrains rotation around all axes except one to permit the inner bowl to be raised or lowered within the mold.

20 Claims, 11 Drawing Sheets

CAPTURE AND PIVOT INSTALLATION FITTINGS

BACKGROUND

Space vehicles, such as a rockets, include a payload fairing. The payload fairing is a nose cone used to house and protect a payload being carried by the spacecraft. The payload can include equipment, supplies, satellites, objects, science and research or other projects, and other physical items being transported on the space vehicle. The payload fairing protects the payload against the impact of dynamic pressure and aerodynamic heating during launch as the vehicle travels through the atmosphere. The dynamic pressure and aerodynamic heating can affect rocket performance (i.e., reduce engine efficiency due to reduce aerodynamics), cause payload fairing failure, or both.

The shape of the payload fairing (e.g., a cone-cylinder combination) helps to also reduce aerodynamic drag during launch. The payload fairing further maintains internal temperature, humidity, and cleanliness of its payload by preventing exposure of its internal compartment(s) of the rocket to the environment or elements. The payload fairing can be jettisoned (i.e., dropped or discarded from the space vehicle) from the space vehicle once outside the atmosphere or at a given altitude, thereby exposing the payload to outer space.

Aerospace and rocket designers and manufacturers keenly focus on maximizing structural integrity and minimizing manufacturing defects. Payload fairing manufacturers can improve structural integrity by manually correcting manufacturing defects, such that the payload fairing can endure the dynamic pressure and aerodynamic heating during launch. Payload fairing manufacturers can also install components within the payload fairing, including hinge fittings, structural components (e.g., supports), window, acoustic blanket, access door, insulator, or the like. Therefore, to correct manufacturing defects or install components, the manufacturers must access an internal surface of the payload fairing.

The state of the art would benefit from an improved system for manufacturing payload fairings, and specifically to accessing an internal surface of a payload fairing during its manufacturing process.

DETAILED DESCRIPTION

Figure 1:
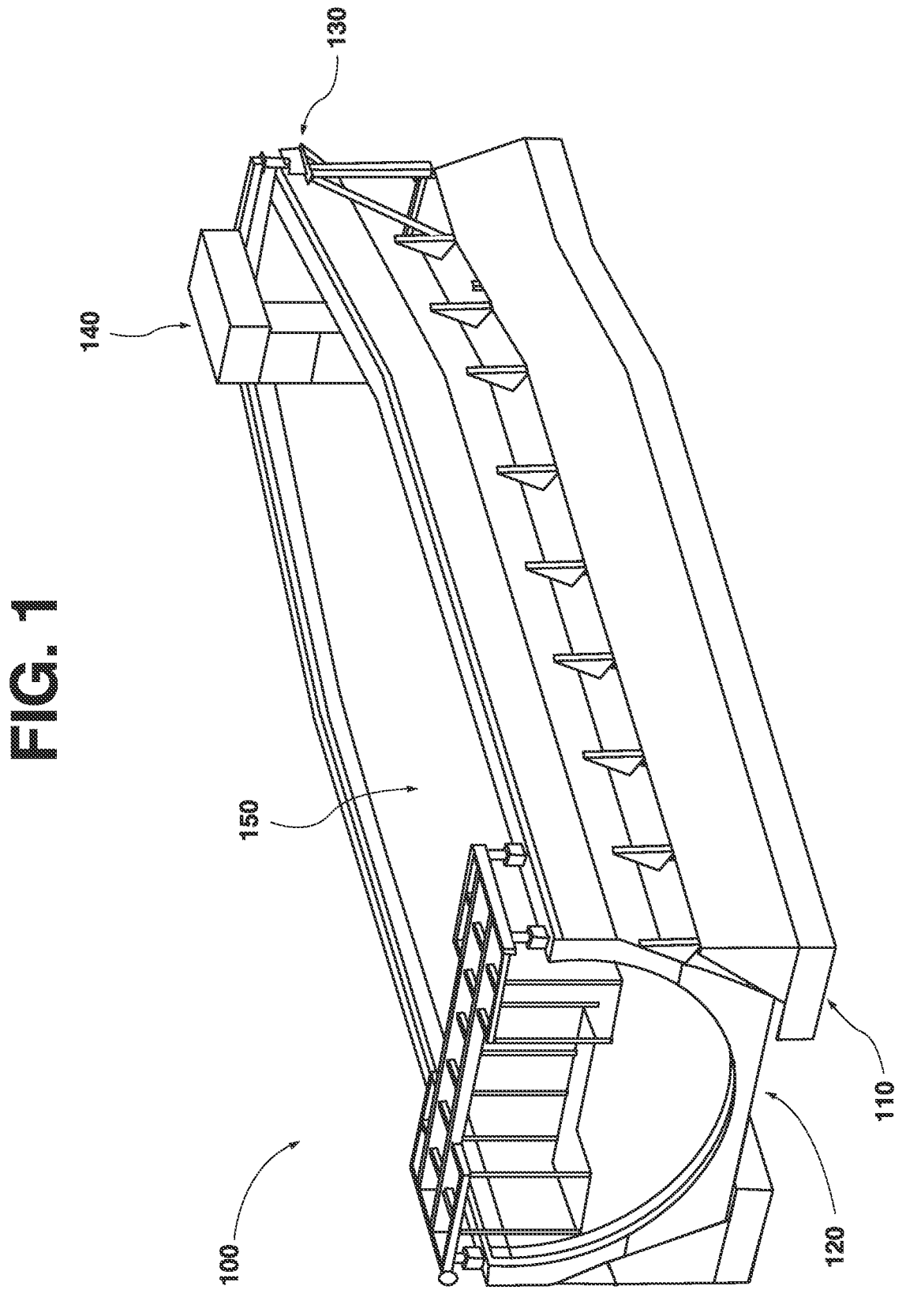
FIG. 1 illustrates an example tooling system to construct a payload fairing.

Systems and methods for manufacturing a payload fairing for a space vehicle. The disclosed systems and method nest scaffolding within a shell of a payload fairing so humans can inspect and craft the interior surface(s) of the payload fairing as it is manufactured. The payload fairing is a nose cone used to house and protect a payload being carried by a space vehicle, such as a rocket. The payload fairing protects a payload against the impact of dynamic pressure and aerodynamic heating during launch through the atmosphere. The payload fairing includes a shell (i.e., an outer casing or housing). The payload fairing can also include internal or external components (e.g., hinge fittings, structural components (e.g., supports), window, acoustic blanket, access door, insulator, or the like), and the payload (i.e., cargo carried by the spacecraft and located within the payload fairing).

Payload fairings can be manufactured by forming two half-shells on or within a mold (e.g., male or female). The two half-shells are then adjoined to form the shell. During manufacturing, scaffolding, including access platforms, can be nested within each half-shell to allow for manual operations (e.g., repairing manufacturing defects, installing various components, or the like) to be performed on the half-shell. Access to the half-shells permits operators to apply one or more additional layers to the half-shell, such as to build up the half-shell, correct manufacturing defects, or the like. Access to the half-shell also permits operators to inspect a surface of the half-shell during or after manufacturing.

The disclosed systems include a nose scaffolding. Typically, to nest the nose scaffolding within the shell, conventional techniques rely on a crane or lift to hold the nose scaffolding above the half-shell and place it into the half-shell manually without capturing and restricting the nose scaffolding, which affects repeatability and can cause damage by not restricting movement of the scaffolding. The crane or lift in the disclosed inventions connects to at least two points of a nose scaffolding and maintains the nose scaffolding in a position or orientation parallel to that of the half-shell. The crane then lowers the nose scaffolding into the shell. The crane can hold the nose scaffolding a given distance from a top or bottom surface of the half-shell (i.e., depending on whether a male or female mold is used). The disclosed inventions restrict translation along orthogonal axes while providing rotation about an axis. This allows the process to be repeatable and to reduce or eliminate damage to the half-shell caused by unsecured scaffolding.

The lack of constraint in the conventional scaffolding placement techniques allows for translation, rotation, or translation and rotation of the nose scaffolding, while within the half-shell, along or around multiple axes (e.g., forward-backward and left-right). Therefore, the translation, rotation, or translation and rotation of the nose scaffolding can permit the nose scaffolding to contact and damage the half-shell, provide an unstable base when performing manual operations, the like, or combinations thereof.

Furthermore, the crane or lift is operated or controlled by a human, which typically requires the use of tag lines (i.e., a rope attached to a lifted load for purposes of controlling load spinning and pendular motions or used to stabilize a bucket or magnet during material handling operations) or a guidance system (e.g., laser pointers). These operations can be unrepeatable due to variations in movement, operator errors, variability between operators, or the like.

To overcome many of these scaffolding placement techniques, the disclosed systems include capture and pivot installation fittings, such as capture buckets on a mold surrounding the fairing along with pivot pins on a nose scaffolding. The mold is a base or structure in which a payload fairing or a half-shell can be manufactured, repaired, or the like. The nose scaffolding is a structure including access platforms to be installed at a nose end of the mold to allow for manual operations to be performed on the half-shell of the payload fairing.

The pivot pin can fit or lock within a catch of the capture bucket, which forms a capture bucket-pivot pin engagement. The capture bucket-pivot pin engagement controls position and restricts movement to rotation around a single axis while restricting translational movement along all axes. The capture bucket-pivot pin engagement also constrains rotation around all axes except one to permit the nose scaffolding to be raised from or lowered within the mold.

Initially, the nose scaffolding is lifted at an inclined angle relative to the mold and maintained at a position above a water line of the mold or the half-shell. The upper water line is an upper rim or an upper edge of the mold or the half-shell. The water line is parallel to a floor on which the mold, the half-shell, or both sit or rest. The nose scaffolding is then moved (i.e., lowered, translated forward or backward, combinations thereof, or the like) until the pivot pin engages the capture bucket. Once engaged, the crane lowers the nose scaffolding, which causes the nose scaffolding to rotate around the one axis and become nested within the mold or the half-shell, when present.

FIG. 1 shows a tooling system 100 to complete manufacturing, fix manufacturing defects, or complete manufacturing and fix manufacturing defects of a half-shell 160 of a payload fairing.

The tooling system 100 provides a system by which operators can access an internal surface of the half-shell 160 (or an external surface, where appropriate or desirous to do so). The tooling system 100 includes a mold 120, a capture apparatus 130, and a nose scaffolding 140. The tooling system 100 can also include a truss 110, and a facesheet (not shown).

Figure 2:
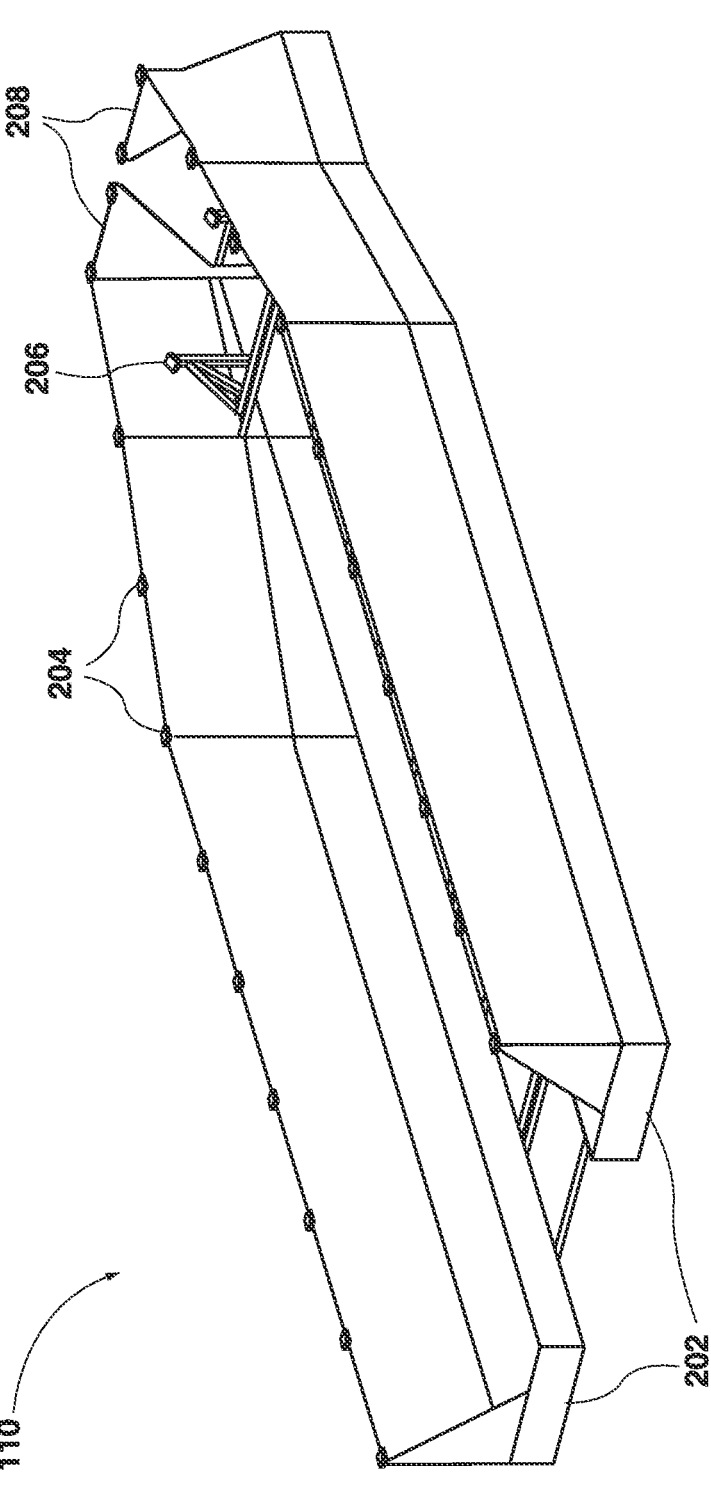
FIG. 2 illustrates an example truss of the example tooling system.

FIG. 2 shows the truss 110 to support and stabilize the mold 120. The truss 110 includes a base 202. The truss 110 includes side supports 204 extending in a first direction (e.g., upwardly or outwardly) from the base 202. The truss 110 also includes first nose supports 206 and second nose supports 208, such that the first and second nose supports 206, 208 have different heights to support a portion of the mold 120 having a height that changes along a length of the mold 120. For example, an external surface of the mold 120 is convex. Therefore, a depth of the mold 120 relative to a water line changes along the length of the mold 120.

The side supports 204, first nose supports 206, and second nose supports 208 can be placed on the base 202 to accept the mold 120. The side supports 204, first nose supports 206, and second nose supports 208 can form a shape that is generally contoured to the external surface of the mold 120.

Figure 3A:
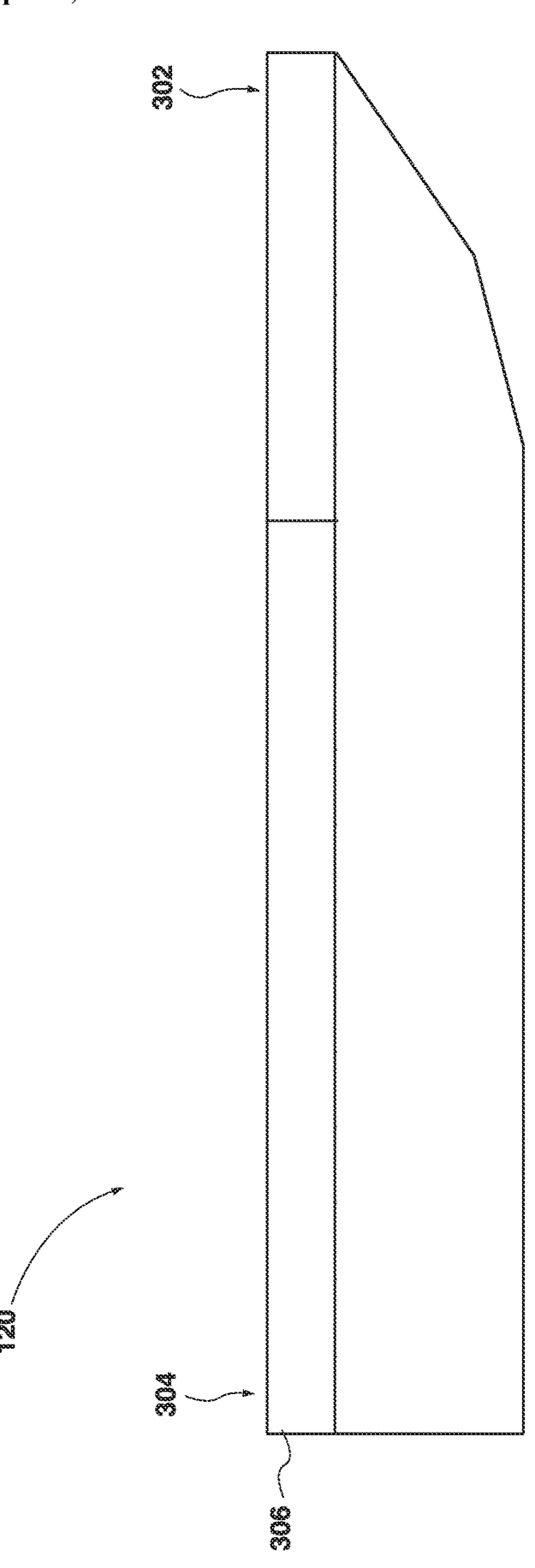
FIGS. 3A-3B illustrates an example mold of the example tooling system.
Figure 3B:
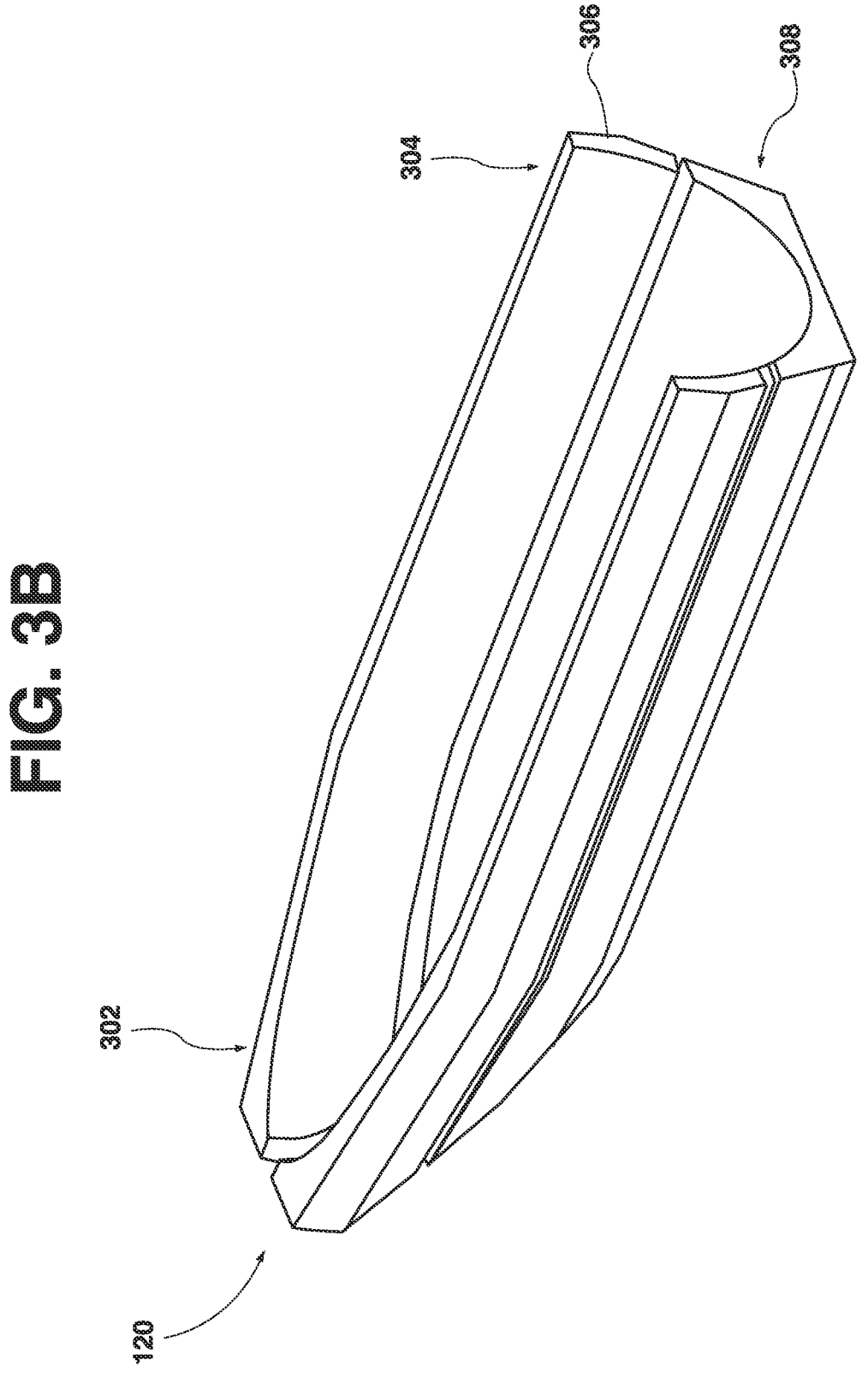

FIG. 3A-3B shows the mold 120. The mold 120 is a structure into which the half-shell 160 can be fully or partially manufactured. For example, the half-shell 160 can be fully manufactured by manufacturing the half-shell 160, such as by additive manufacturing, within the mold 120. Then, any manufacturing defects of the half-shell 160 can be corrected or fixed, components of the shell 160 can be added internally or externally (e.g., hinge fittings, structural components (e.g., supports), window, acoustic blanket, access door, insulator, or the like), or manufacturing defects can be corrected and components can be added. As another example, the half-shell 160 can be partially manufactured by manufacturing the half-shell 160 externally from the mold 120. Then, the half-shell 160 is inserted into the mold 120. Once the half-shell 160 is inserted into the mold 120, manufacturing defects of the half-shell 160 can be corrected or fixed, components of the shell 160 can be added internally or externally (e.g., hinge fittings, structural components (e.g., supports), window, acoustic blanket, access door, insulator, or the like), or manufacturing defects can be corrected and components can be added.

In one example, the full shell can be fully manufactured by manufacturing two half-shells separately within the mold 120. The two half-shells can then be adjoined while a first half-shell is held within the mold 120 and a second half-shell is placed in contact with the first half-shell. The two half-shells can then adjoined, whether mechanically (e.g., by welding, clamping, bolting, riveting, attached via a hinge, or the like), chemically (e.g. with an adhesive, an epoxy, or the like), or the like.

The mold 120 includes a main body 306 having a cavity 308 extending from a nose end 302 to a back end 304. The cavity 308 can be concave or convex. The cavity 308 is complementary in size and shape to the half-shell 160. The cavity 308 can accept the half-shell 160 that has been previously manufactured or can allow for manufacture of the half-shell 160 within the mold 120. For example, the cavity 308 can have a first segment being an elongated hemisphere (i.e., an empty half cylinder) and a second segment being a half cone. As another example, the cavity 308 can have a constant size or shape along the length of the cavity 308 (i.e., from the nose end 302 to the back end 304). As yet another example, the cavity 308 can be tapered or have varying diameters or radii along the length of the cavity 308.

The main body 306 also includes a first side and a second side. The main body 306 can be solid or can include gaps or spaces, such as when formed by multiple rods.

Figure 4:
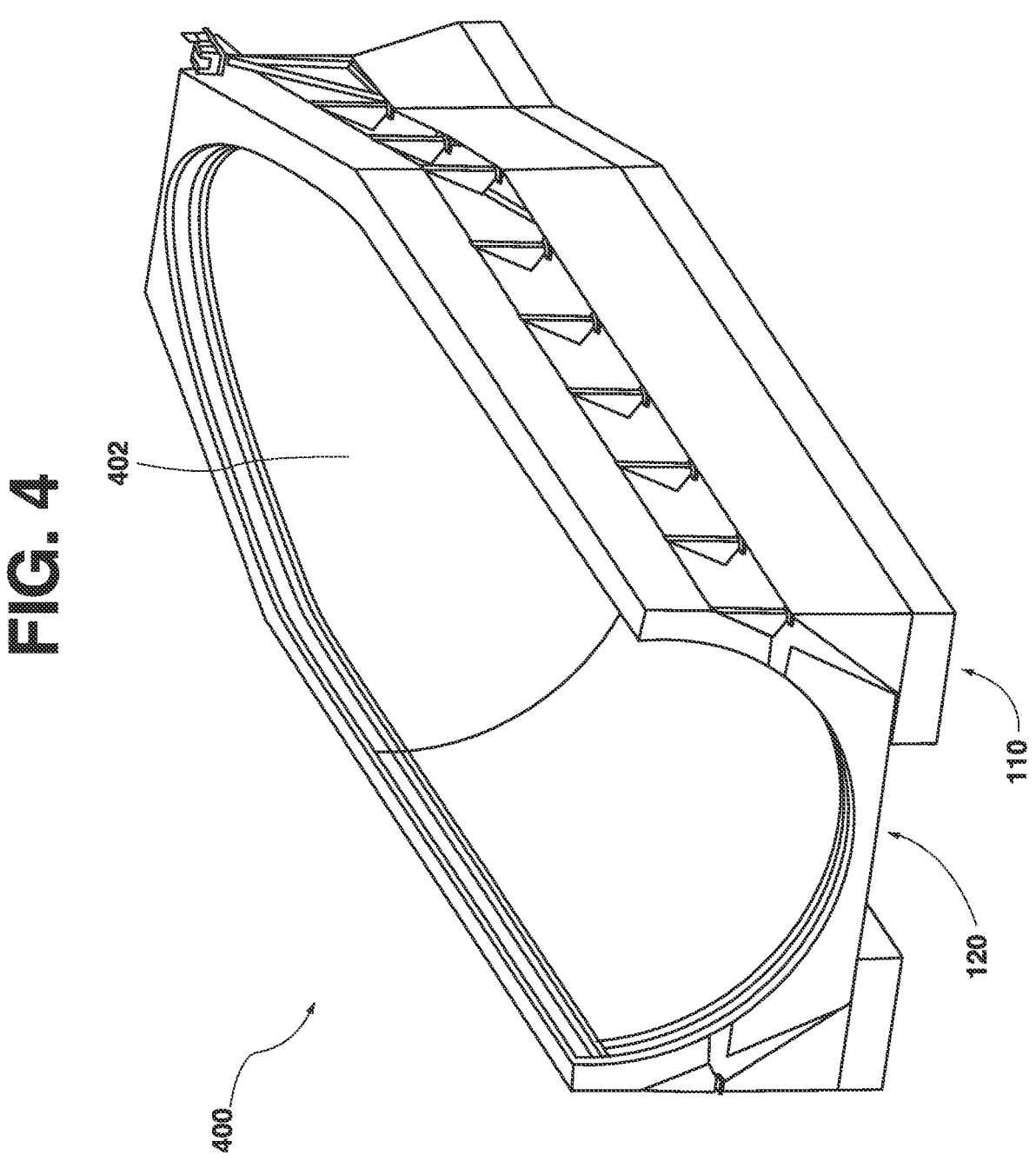
FIG. 4 illustrates an example sub-system of the example tooling system.

FIG. 4 shows a sub-system 400 of the tooling system 100. The sub-system 400 includes the truss 110, the mold 120, and a facesheet 402 within the cavity 308 of the mold 120. The facesheet 402 is an insert which provides a surface into which temperature sensors (e.g., thermocouples, thermistors, resistance temperature detector, or semiconductor-based integrated circuits) can be embedded, a surface onto which temperature sensors can be connected, or a surface through which temperature sensors can detect temperatures. The facesheet 402 can receive the half-shell 160 or provided a surface onto which the half-shell 160 can be manufactured.

The temperature sensors can be used to detect absolute temperatures, changes in temperatures, or both when the half-shell 160 is being manufactured, fixing manufacturing defects of the half-shell 160, integrating components onto or into the half-shell 160, or the like. Detecting the absolute temperatures or changes in temperatures can provide temperature data to ensure that the material of the half-shell 160 is not being compromised, that the manufacturing of the half-shell 160 is not being compromised, or the like.

The facesheet 402 can extend the entire length of the cavity 308 or a portion of the length of the cavity 308. The facesheet 402 can also be the same size and shape as the cavity 308 or the half-shell 160.

Figure 5A:
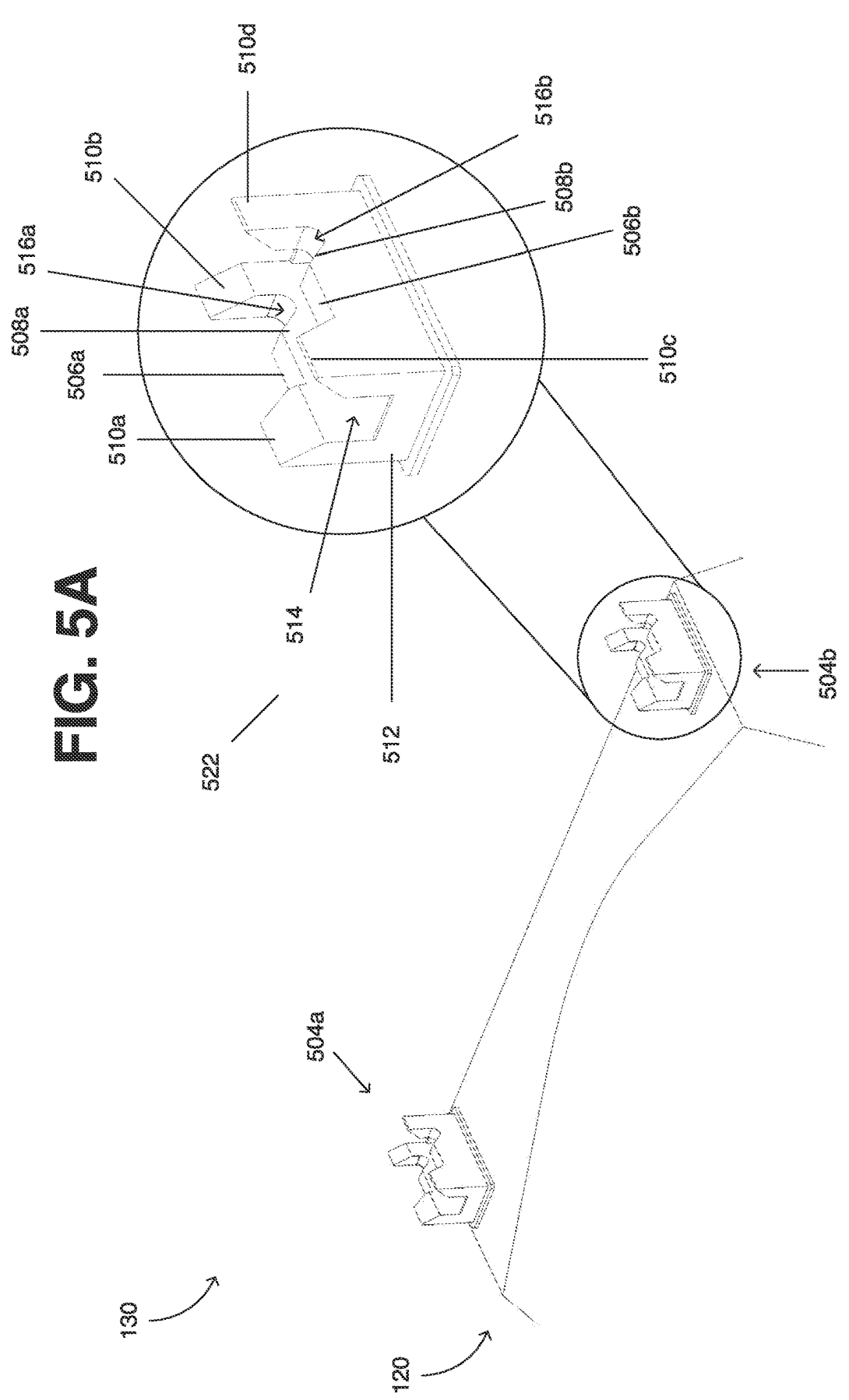
FIG. 5A illustrates an example capture apparatus of the example tooling system.

FIG. 5A shows the capture apparatus 130.nose scaffolding 140 nose scaffolding 140.

The capture apparatus 130 includes a first capture bucket 504a on a first side of a front end of the mold 120. The capture apparatus 130 includes a second capture bucket 504b on a second side of a front end of the mold 120. The first and second capture buckets 504a, 504b are mirror images of each other, include the same elements or components, and perform the same function. Accordingly, the elements, components, and functions of the second capture bucket 504b, as further described herein, also apply to the first capture bucket 504a.

Figure 5B:
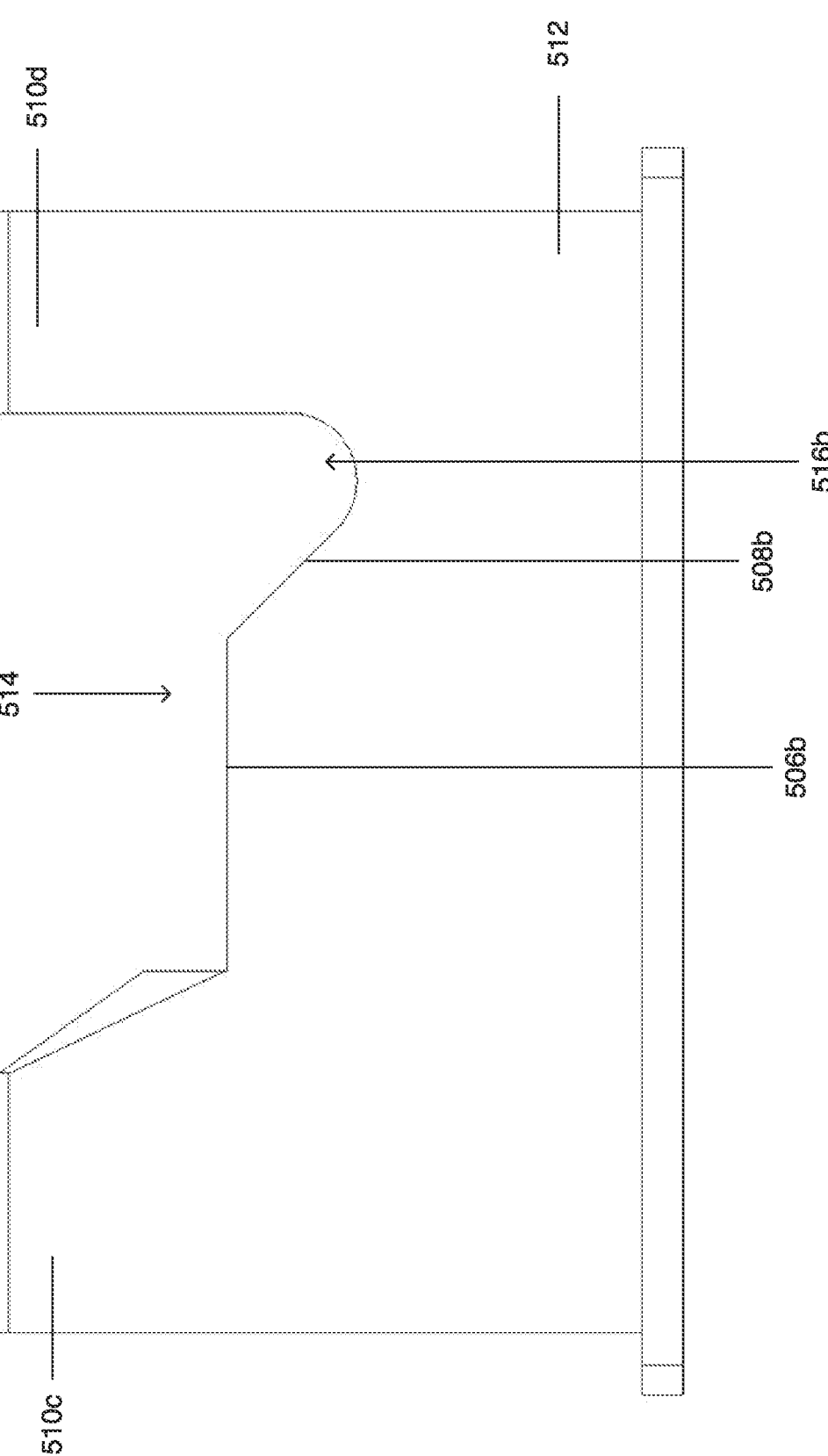
FIG. 5B illustrates an example capture bucket of the example capture apparatus.

The second capture bucket 504*b*, as seen in magnified view 522 and a side view in FIG. 5B, includes posts 510*a-d* extending in a common direction (e.g., upwardly) from a base 512. The posts 510*a-d* restrict translational movement of the nose scaffolding 140 along one or more orthogonal axis (e.g., x-axis, y-axis, or z-axis). The posts 510*a-d* also restricts rotation of the nose scaffolding 140 around two orthogonal axes, while allowing for rotation around one orthogonal axis.

A first side of the base 512 includes two posts 510*a*, 510*b* separated by a first distance. A second side of the base 512 includes two posts 510*c*, 510*d* separated by a second distance. The first and the second distances are the same. A support surface 506*a* which transitions into a slope 508*a* extends between posts 510*a*, 510*b*. A support surface 506*b* which transitions into a slope 508*b* extends between posts 510*c*, 510*d*. The support surfaces 506*a-b* provide a surface onto which opposing sides of the pivot pin (not shown) can rest or be supported when the pivot pin (not shown) is inserted into the capture bucket 504*b*. The slope 508*a-b* provides a surface to guide and transition the opposing sides of the pivot pin (not shown) into a first catch 516*a* and a second catch b. The support surfaces 506*a*, 506*b* in combination with the slopes 508*a*, 508*b* for guide portions. The guide portions can guide the pivot pins (not shown) into the catches, such as the first catch 516*a* and the second catch 516*b*.

The first catch 516*a* and the second catch 516*b* can lock and engage the opposing sides of the pivot pin (not shown) to restrict translational movement and rotation of the nose scaffolding 140, while allowing for rotation around one orthogonal axis.

The capture bucket 504*b* also includes the first catch 516*a* to lock or engage a first side of the pivot pin (not shown) of the nose scaffolding 140. The first catch 516*a* is formed wherein the slope 508*a* meets or adjoins the post 510*b*. The post 510*b* can also include a cutout (not shown), such that the first catch 516*a* is larger, has a shape that is contoured to the pivot pin (not shown), or the like.

The capture bucket 504*b* also includes the second catch 516*b* to lock or engage a second side of the pivot pin (not shown) of the nose scaffolding 140. The second catch 516*b* is formed wherein the slope 508*b* meets or adjoins the post 510*d*. The post 510*d* can also include a cutout (not shown), such that the second catch 516*b* is larger, has a shape that is contoured to the pivot pin (not shown), or the like.

The capture bucket 504*b* also includes a cavity 514 between posts 510*a*, 510*b* and posts 510*c*, 510*d* and extending from a first end to a second end. The cavity 514 can accept and engage a stabilizer bar (not shown) of the nose scaffolding 140 to align the nose scaffolding 140 and inhibit or reduce translation movement and rotation.

Figure 6A:
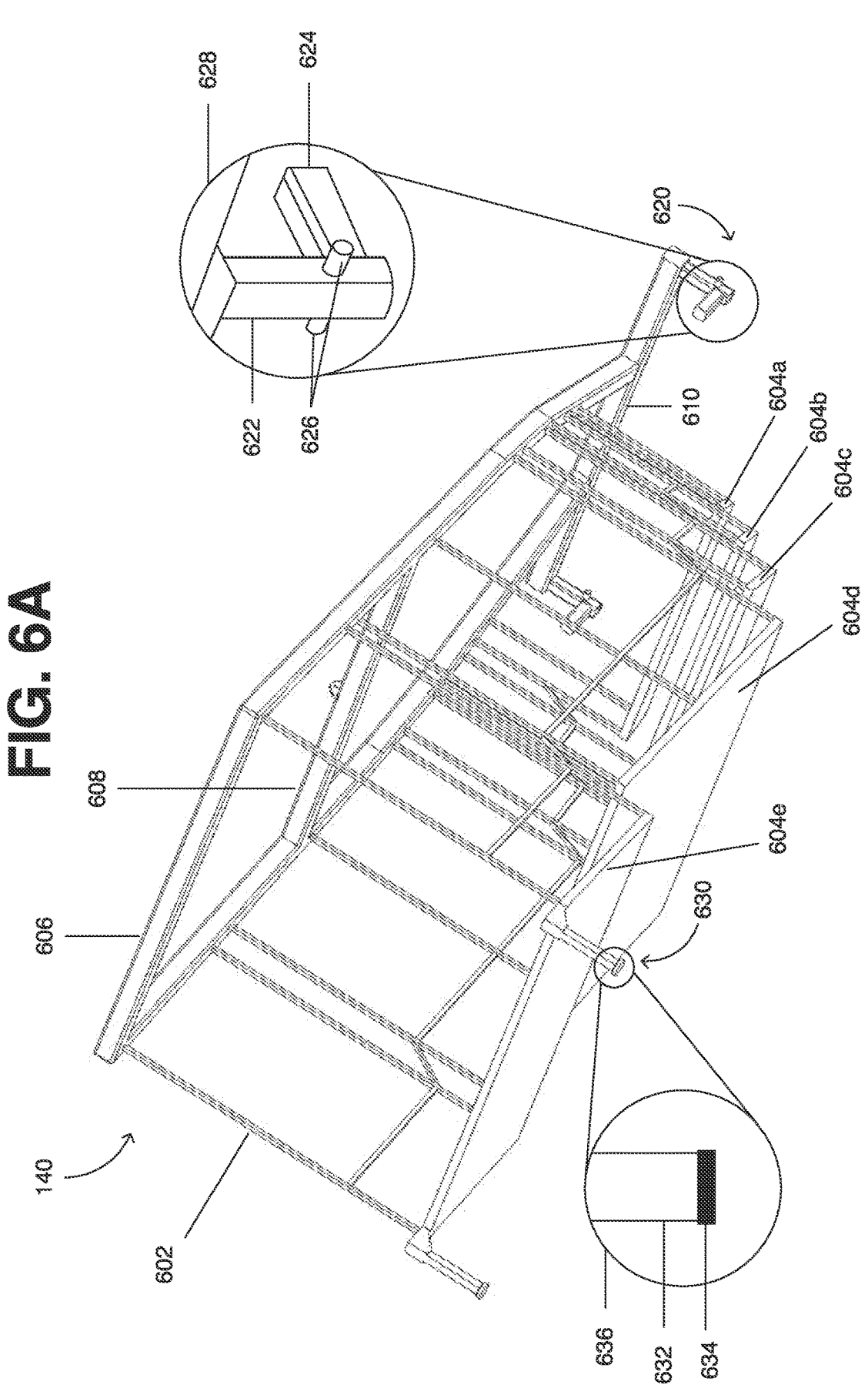
FIGS. 6A-6B illustrate an example nose scaffolding of the example tooling system.
Figure 6B:
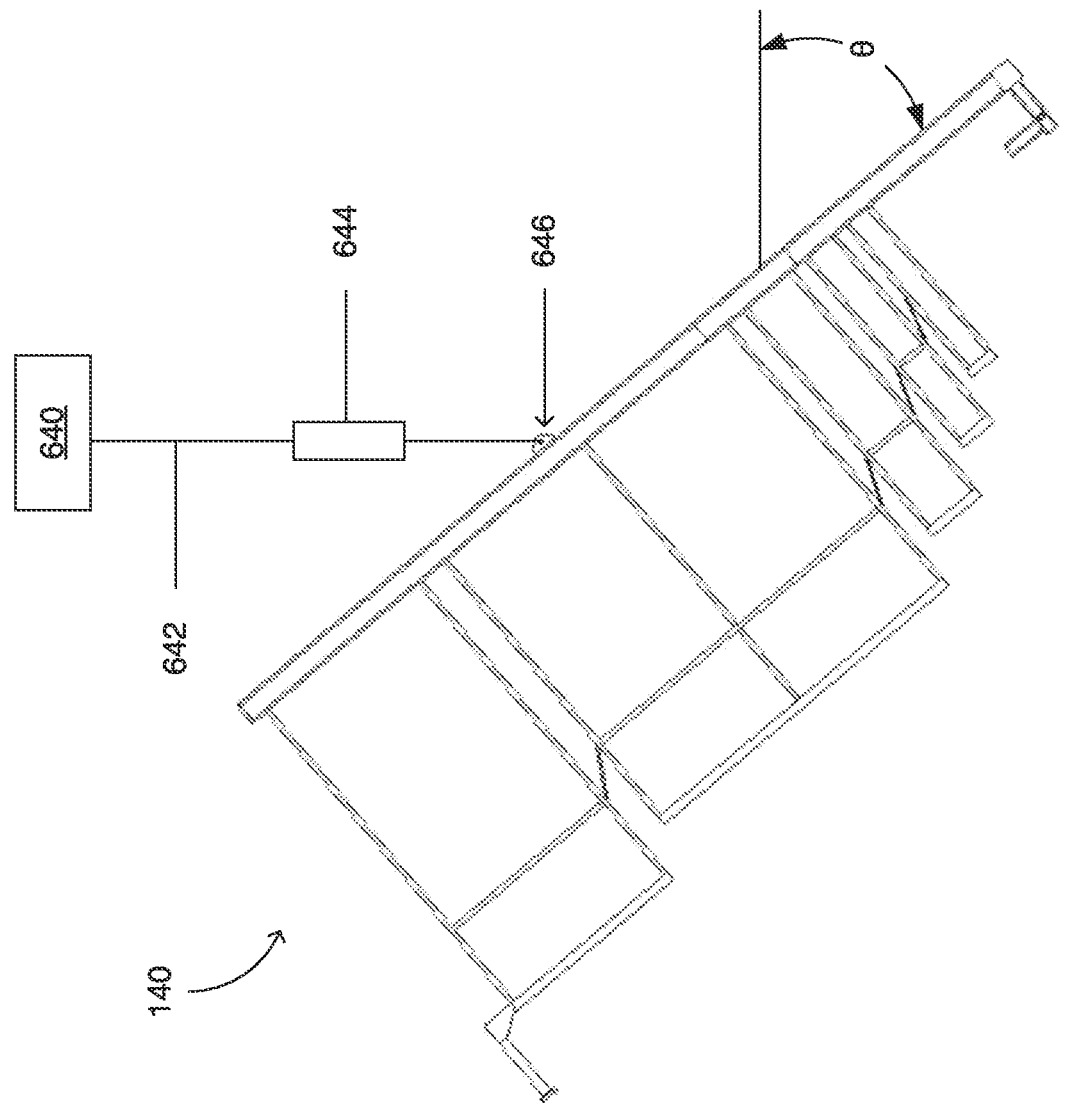
Figure 7A:
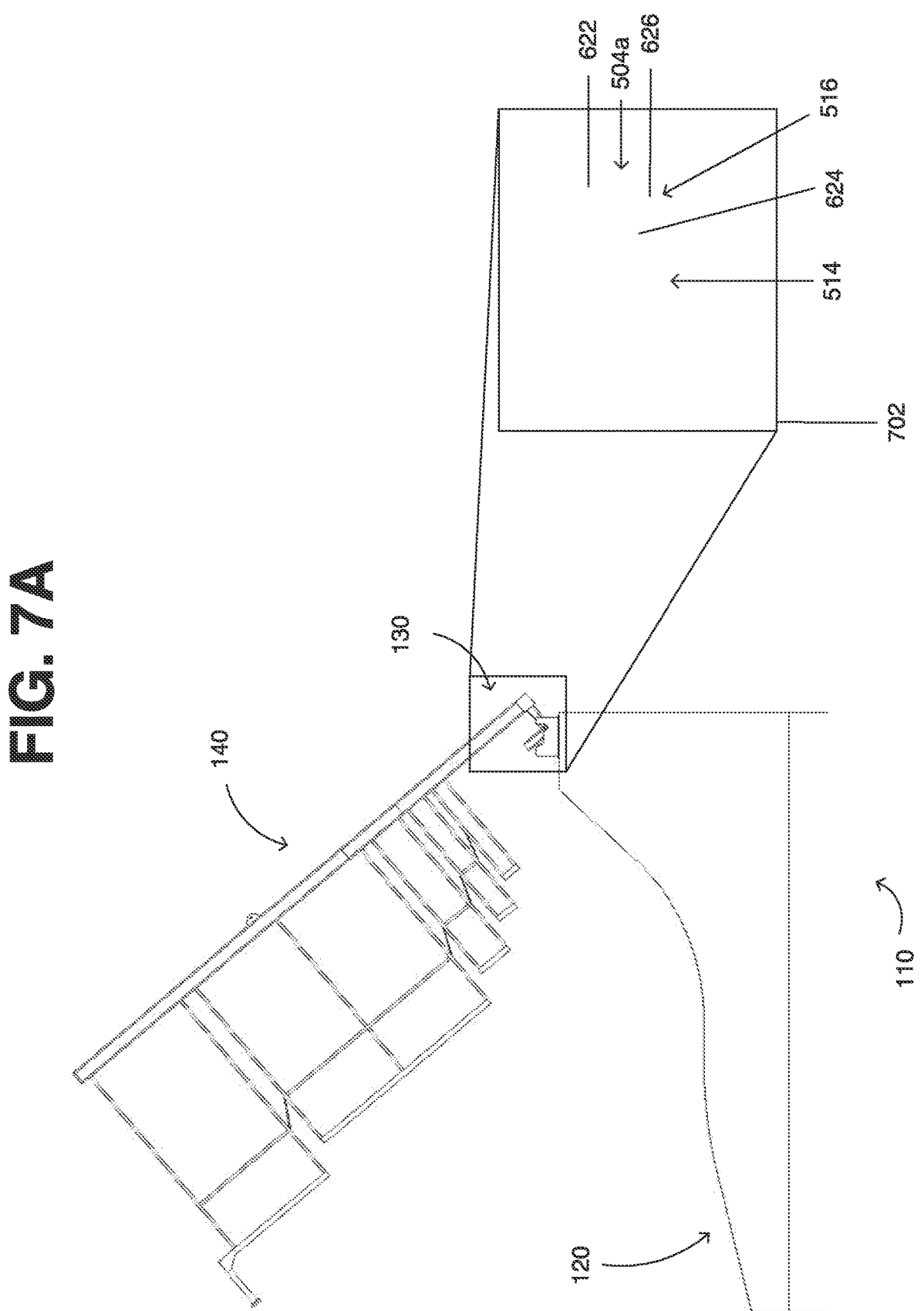
FIGS. 7A-7B illustrate the example nose scaffolding being nested within the example mold.
Figure 7B:
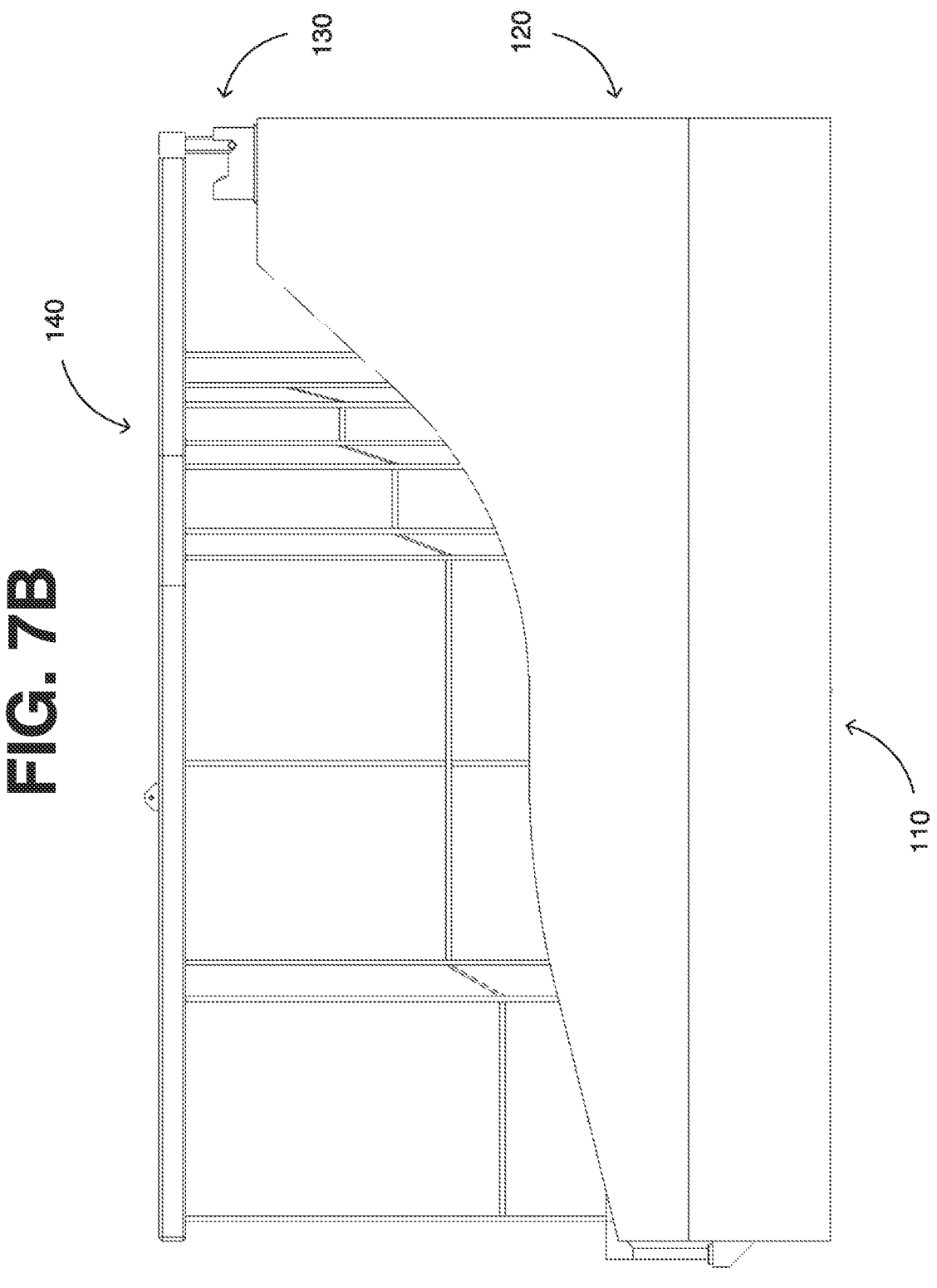

FIGS. 6A-6B show the nose scaffolding 140. The nose scaffolding 140 includes a frame 602 to support other components of the nose scaffolding 140. The frame 602 includes an 6access platforms 604*a-604e*. The 6access platforms 604*a-604e* provides a surface onto which an operator can stand or lay (e.g., walkway, stairs, or the like) to access an internal surface of the half-shell 160 (or an external surface, where appropriate or desirous to do so). Sides or edges of the 6access platforms 604*a-604e* can be 24 inches or less (e.g., 1 inch, 4 inches, 8 inches, 12 inches, 16 inches, 18 inches, or the like) from the internal surface of the half-shell 160 (or an external surface, where appropriate or desirous to do so). This distance can be set based on safety standards, efficiency standards, or the like.

The 6access platforms 604*a-604e* can be on an external portion of the nose scaffolding 140, a central portion of the nose scaffolding 140, or a portion of the nose scaffolding 140 between the central portion and the external portion of the nose scaffolding 140. The nose scaffolding 140 can include multiple platforms to provide access to different portions of the half-shell 160. When multiple access platforms are included, the multiple access platforms can be located on the same plane, different planes, or access platforms on both the same plane and different planes. The multiple access platforms can be located on opposing sides of the nose scaffolding 140, on the same side of the nose scaffolding 140, or the like.

The nose scaffolding 140 also includes a first support bar 606 and a second support bar 608. The first and second support bars 606, 608 can extend from the first side of the nose scaffolding 140 to the second side of the nose scaffolding 105, can extend beyond the first and second sides of the platform 602, or the like.

Each of the first and second support bars 606, 608 includes a first end and a second end, such that each end of the first and second support bars 606, 608 includes a foot 634, as shown in magnified view 6636. Each foot 634 is connected to the respective first and second support bars 606, 608 via a strut 632. The foot 634 can engage with an upper surface of the main body 306 of the mold 120 or be inserted into a hole (not shown) on an upper surface of the mold 120. The foot 634 can stabilize the nose scaffolding 140 when engaged with the mold 120 to prevent translation or rotation of the nose scaffolding 140 relative to the mold 120 or the half-shell 160. The foot 634 can also support a portion of the mass of the nose scaffolding 140 to prevent buckling or collapse when installed on or within the mold 120.

The nose scaffolding 140 also includes an engagement bar 610. The engagement bar 610 can extend from the first side of the nose scaffolding 140 to the second side of the nose scaffolding 105, can extend beyond the first and second sides of the platform 602, or the like. The engagement bar 610 includes a first end and a second end, such that each end includes a ballast 620. Each ballast 620 includes a pivot pin 626 and a stabilizer bar 624 connected to the respective side with a strut 622, as shown in magnified view 6628. The pivot pin 626 is a bar or rod extending outwardly from or through the strut 622 in a direction perpendicular to the direction in which the strut 622 extends from the engagement bar 610. The pivot pin 626 engages with the catch 516 of each capture bucket 504*a*, 504*b* to allow for rotation of the nose scaffolding 140 around or about an axis.

The stabilizer bar 624 extends outwardly from the strut 622 in a direction perpendicular to the strut 622 and the pivot pin 626. The stabilizer bar 624 engages with the cavity 514 of each capture bucket 504*a*, 504*b* to inhibit translation of the nose scaffolding 140 along an orthogonal axis or rotation of the nose scaffolding 140 around an orthogonal axis.

The nose scaffolding 140 also includes an attachment bracket 646. The attachment bracket 646 provides an attachment point to engage with a lift 640 (e.g., a crane) via a cable 642. The cable 642 can include a spreader bar 644 to distribute the load of a lift across more than one point, thereby increasing stability and decreasing applied loads during hoisting. The attachment bracket 646 is placed at a point on the frame 602 to cause the nose scaffolding 140 to tilt to a desired angle (0) relative to a horizontal axis when the nose scaffolding 140 is free-floating in the air when held by the lift 640. The desired angle (0) can be 35° to 55°. Though one attachment bracket is discussed herein, multiple attachment brackets can be used to provide the desired lift angle when installing or removing the nose scaffolding 140 from the mold 120.

The attachment bar 610, when the nose scaffolding 140 is installed on the mold 120, is proximal to the nose end 302 of the mold 120. The first support bar 606, when the nose scaffolding 140 is installed on the mold 120, is distal to the nose end 302 of the mold 120 relative to the attachment bar 610. The second support bar 608 can be located between the attachment bar 610 and the first support bar 606.

FIGS. 8A-8B show a process for attaching the nose scaffolding 140 to the capture apparatus 130 for insertion into the mold 120. To insert the nose scaffolding 140 into the mold 120, the nose scaffolding 140 is raised with the lift 640, such as from a support on which the nose scaffolding 140 is stored or from the ground. The nose scaffolding 140, when raised by the lift 640, is tilted at the desired angle (0). When lifted and tilted, the attachment bar 610 is lower than the first support bar 606. The attachment bar 610 is brought proximal to the capture apparatus 130 at the nose end 302 of the mold 120.

The nose scaffolding 140 is lowered from a first height to a second height. As the nose scaffolding 140 is lowered from the first height to the second height, the pivot pin 626 of each ballast 620 engages with the support surface 506b of the capture bucket 504b. Until the pivot pin 626 of each ballast 620 engages with the catch 516 of the capture bucket 504b, the nose scaffolding 140 remains above a water line of the half-shell 160 or the mold 120. The water line is an uppermost rim or edge of the half-shell 160 or the mold 120 that is parallel to the floor or ground on which the half-shell 160 or the mold 120 rest.

As the nose scaffolding 140 is lowered from the first height to the second height, the stabilizer bar 624 enters the cavity 514 of the capture bucket 504b. In one example, when the pivot pin 626 engages the support surface 506b, the cable 642 is taut. Therefore, when the pivot pin 626 is moved proximal to the catch 516, the pivot pin 626 slides along the support surface 506b. As the pivot pin 626 approaches the slope 508b, the height of the nose scaffolding 140 is changed by the lift 640, such that the pivot pin 626 can slide down the slope 508b and into the catch 516 without causing the lift 640. In another example, when the pivot pin 626 engages the support surface 506b, the cable 642 has slack. Therefore, when the pivot pin 626 is moved proximal to the catch 516, the pivot pin 626 slides along the support surface 506b, down the slope 508b, and into the catch 516 without causing the lift 640 to change the height of the nose scaffolding (i.e., the lift 140 just causes the nose scaffolding 140 to translate within the capture bucket 504b).

Once the pivot pin 626 is engaged with the catch 516, the nose scaffolding 140 is lowered such that the nose scaffolding 140 rotates about an axis coaxial to the pivot pin 626 and the catch 516. The feet 634 engage the main body 306 of the mold 120 once the nose scaffolding 140 is lowered and rotated to be parallel (or substantially parallel, e.g. ±5°) to an upper surface of the main body 306 of the mold 120. The stabilizer bar 624 can also rest within the cavity 514 to prevent translation or rotation along or around one or more orthogonal axes.

To remove the nose scaffolding 140 from the mold 120, the process is reversed (i.e., the nose scaffolding 140 is rotated away from the mold 120 via the lift 640. Once the nose scaffolding 140 reaches a given angle relative to the horizontal axis, the lift 640 raises (i.e., changes the height of) the nose scaffolding 140 away from the mold 120.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A system for accessing a surface of a payload fairing, the system comprising:

a mold including a nose end including a first capture bucket on a first side, and a second capture bucket on a second side, two opposing sides, a back end, a cavity defined by the opposing sides and the nose end and the back end; and a nose scaffolding including a first ballast on a first side, and a second ballast on a second side, each of the ballasts including a pivot pin structured to engage a guide portion of an access frame shaped to fit within the cavity, and a stabilizer bar structured to stabilize the guide portion of the access frame when the guide portion is engaged with the pivot pin.

2. The system of claim 1, wherein the first and second ballasts further comprise stabilizer bars configured to engage cavities of the first and second capture buckets, respectively.

3. The system of claim 1, wherein the nose scaffolding further comprises an access platform structured to permit an operator to access a surface of a half-shell of a payload fairing supported within the cavity of the mold.

4. The system of claim 1, wherein the nose scaffolding further comprises an attachment bar including feet on opposing sides of the attachment bar, the feet configured to support or stabilize the nose scaffolding against an upper surface of the mold.

5. The system of claim 1, wherein each of the first and second capture buckets includes two sets of posts, the posts extending from a base in a same direction.

6. The system of claim 1, wherein the nose scaffolding includes an attachment bracket structure to provide an attachment point to engage with a lift device.

7. The system of claim 5, wherein each set of posts includes two posts separated by a distance.

8. The system of claim 7, wherein each set of posts includes a catch located between the posts, the catch being structured to lock or engage one of the pivot pins.

9. The system of claim 8, wherein each set of posts includes a support surface located between the posts, the support surface being structured to support one of the pivot pins.

10. The system of claim 9, wherein each set of posts includes a slope located between the posts, the slope being structured to transition one of the pivot pins from the support surface to the catch.

11. The system of claim 6, wherein the attachment bracket is located at a point on the nose scaffolding to cause the nose scaffolding to tilt to a desired angle relative to a horizontal axis when the nose scaffolding is free-floating in the air when held by the lift device, the desired angle being 35° to 55°.

12. A system for installing scaffolding into a mold used to form a payload fairing, the system comprising:

a mold including a cavity and a capture apparatus comprising a first capture bucket disposed on a first side of a nose end of the mold, and a second capture bucket disposed on a second side of the nose end of the mold;

a nose scaffolding comprising an access frame configured to be received within the cavity, a first pivot pin extending laterally from a first side of the access frame and a second pivot pin extending laterally from a second side of the access frame, wherein each pivot pin is structured to seat within a respective capture bucket to constrain translational motion and permit rotation about a shared axis; and a stabilizer bar associated with at least one of the pivot pins and configured to seat within a cavity of the respective capture bucket to further inhibit relative motion between the nose scaffolding and the mold.

13. The system of claim 12, wherein the access frame comprises an access platform configured to permit an opera- tor to access an internal surface of a half-shell of the payload fairing when the access frame is received within the cavity.

14. The system of claim 12, wherein the cavity of the mold comprises a concave contour that is complementary in shape to an exterior surface of the access frame.

15. The system of claim 12, wherein the nose scaffolding further comprises an attachment bracket disposed at a location on the access frame such that the nose scaffolding assumes a tilt angle between 35 degrees and 55 degrees relative to a horizontal axis when the nose scaffolding is suspended from a lift device.

16. The system of claim 12, wherein each of the first pivot pin and the second pivot pin comprises a non-cylindrical cross-sectional shape configured to interface with a corresponding internal surface of the respective capture bucket.

17. The system of claim 12, wherein the mold further comprises one or more alignment features disposed on an upper surface of the mold and configured to facilitate positioning of the nose scaffolding during installation.

18. The system of claim 12, wherein the nose scaffolding further comprises a spreader bar configured to distribute load between multiple lift points when the nose scaffolding is suspended by the lift device.

19. The system of claim 12, wherein each of the first capture bucket and the second capture bucket comprises a base and a pair of posts extending from the base in a common direction, the pair of posts being arranged to define a guide region.

20. The system of claim 19, wherein the guide region comprises a support surface and a sloped surface, the sloped surface configured to guide one of the first pivot pin or the second pivot pin into a catch disposed between the pair of posts.

* * * * *